Dec. 27, 1938.  C. HARWOOD, JR  2,141,864
CONVERTIBLE RAILWAY VEHICLE
Filed June 23, 1937  6 Sheets-Sheet 1
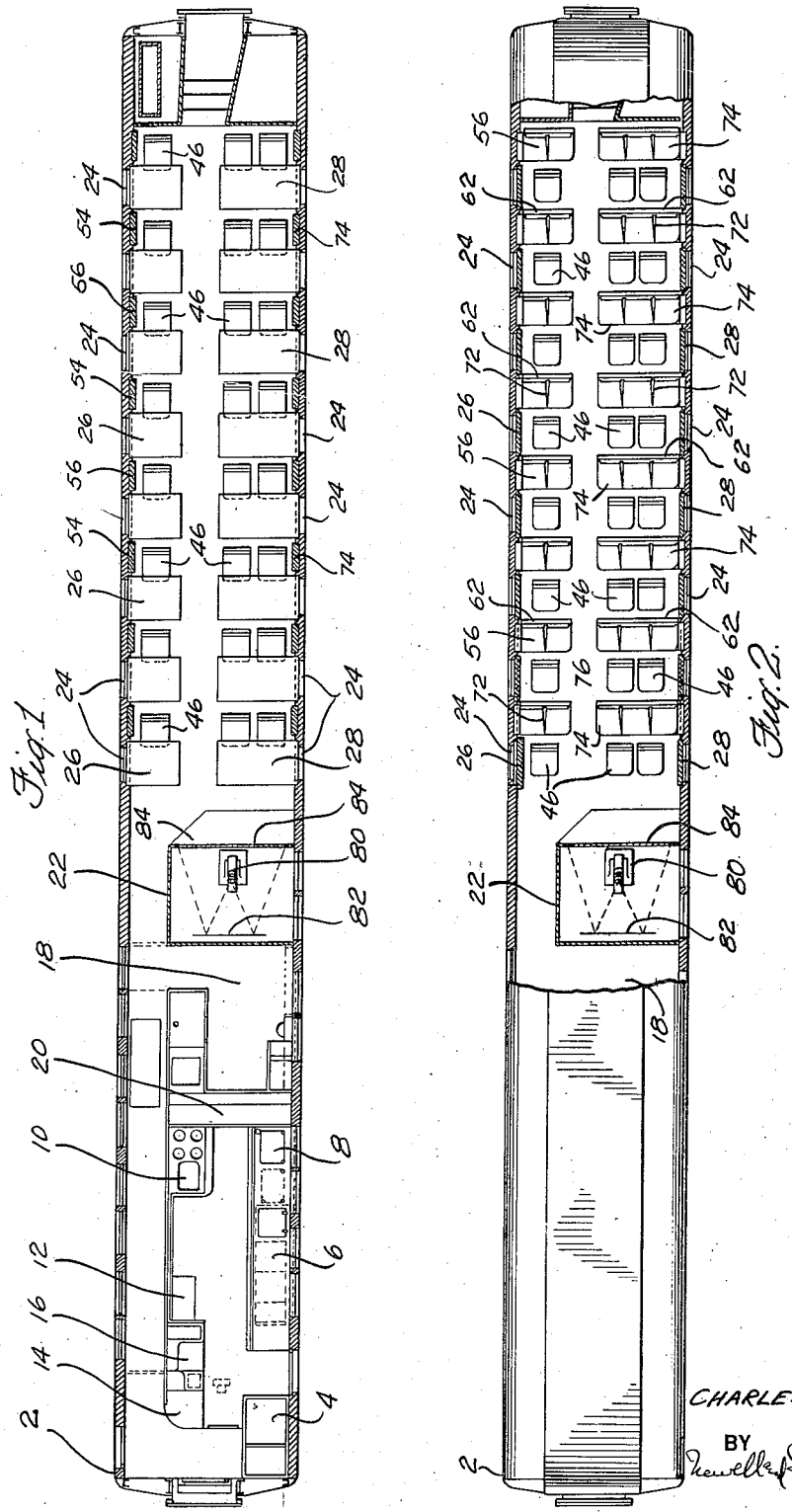
INVENTOR
CHARLES HARWOOD JR.
BY
ATTORNEYS Dec. 27, 1938.   C. HARWOOD, JR   2,141,864
CONVERTIBLE RAILWAY VEHICLE
Filed June 23, 1937   6 Sheets-Sheet 2
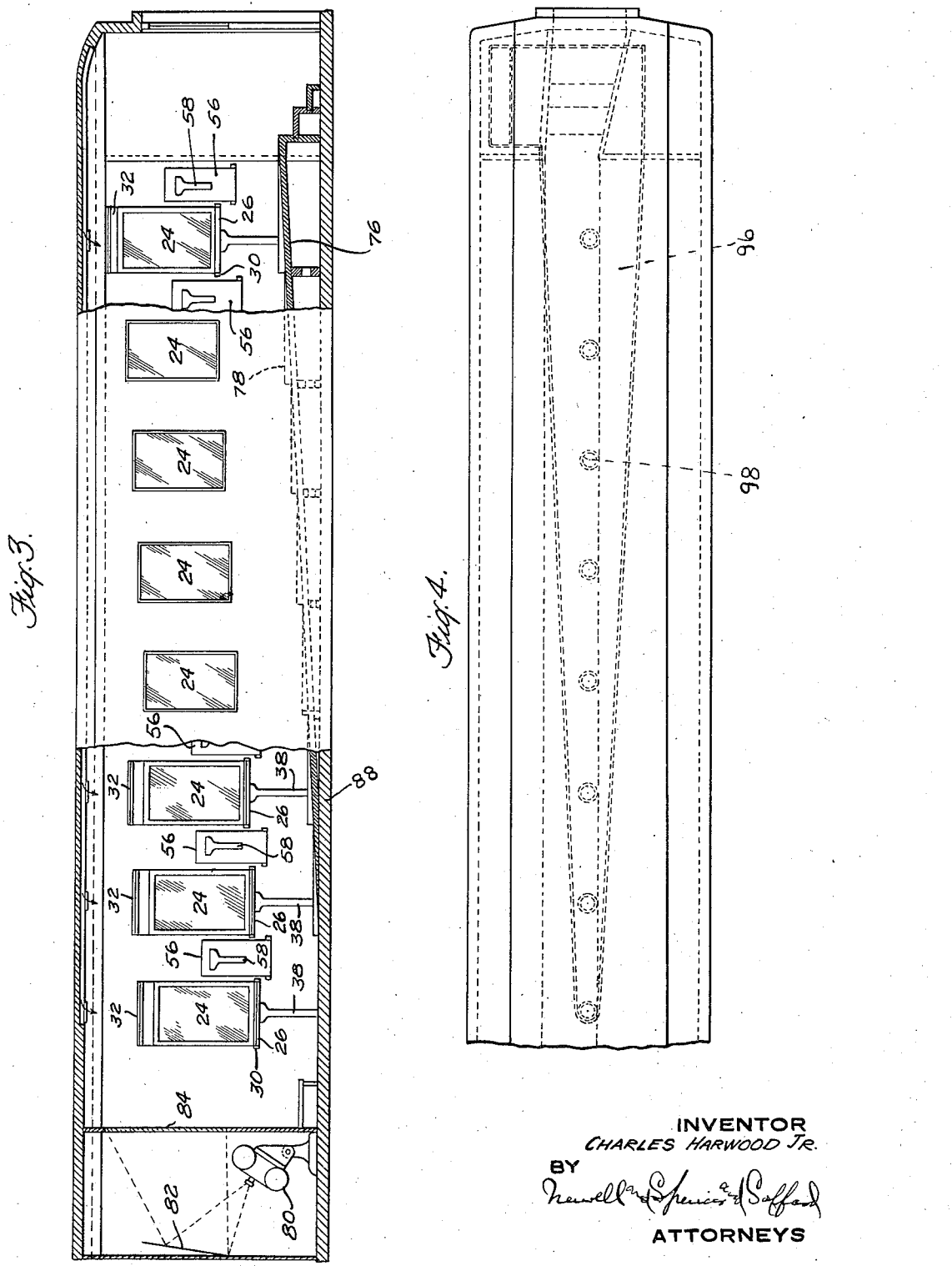
INVENTOR
CHARLES HARWOOD JR.
BY
ATTORNEYS Dec. 27, 1938.  C. HARWOOD, JR  2,141,864
CONVERTIBLE RAILWAY VEHICLE
Filed June 23, 1937  6 Sheets—Sheet 3

INVENTOR
CHARLES HARWOOD JR.
BY
ATTORNEYS

Dec. 27, 1938.  C. HARWOOD, JR  2,141,864
CONVERTIBLE RAILWAY VEHICLE
Filed June 23, 1937  6 Sheets—Sheet 4
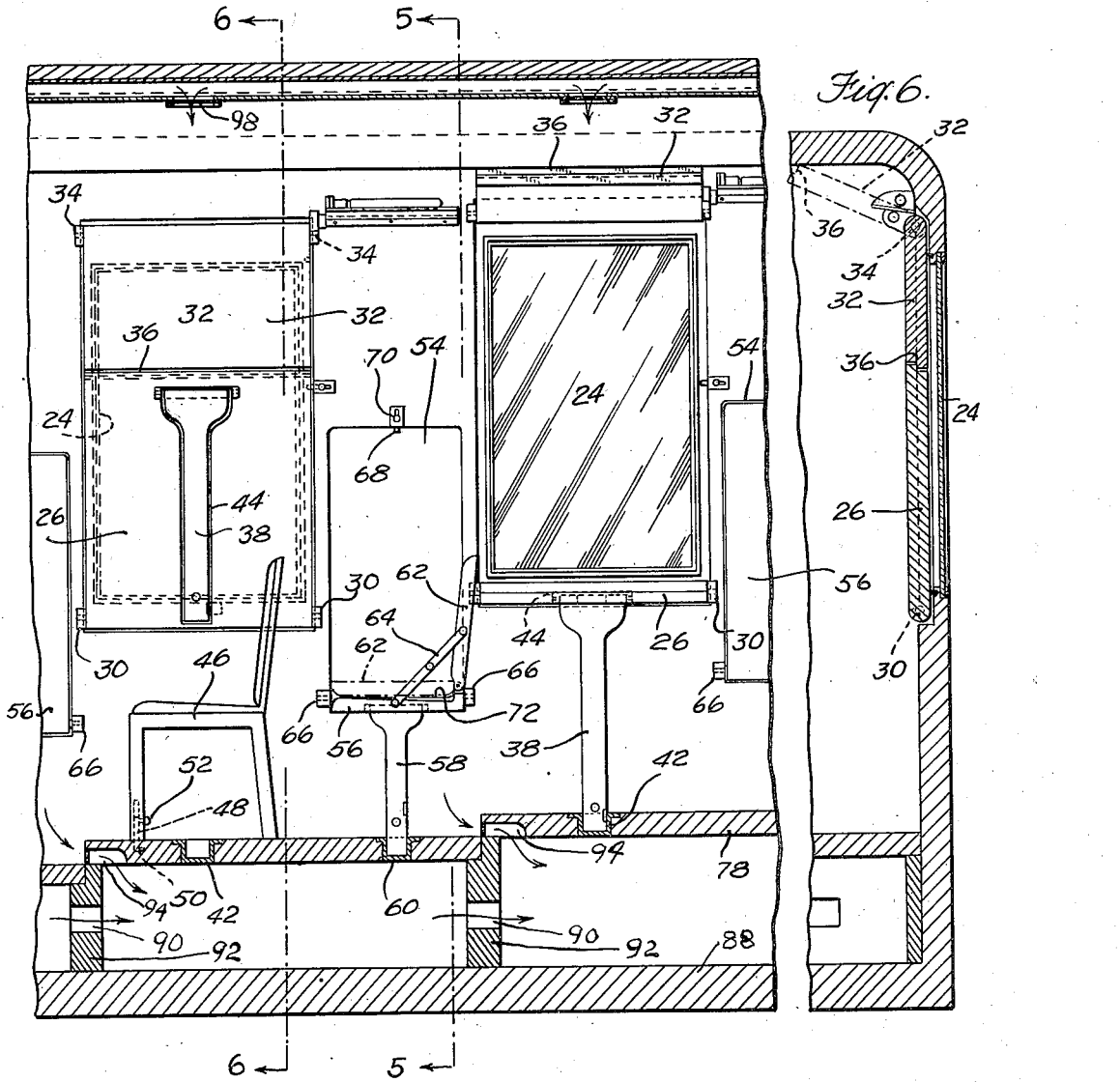
INVENTOR
CHARLES HARWOOD JR.
BY
ATTORNEYS Dec. 27, 1938.   C. HARWOOD, JR   2,141,864
CONVERTIBLE RAILWAY VEHICLE
Filed June 23, 1937   6 Sheets-Sheet 5

INVENTOR
CHARLES HARWOOD JR.
BY
ATTORNEYS

Patented Dec. 27, 1938

2,141,864

UNITED STATES PATENT OFFICE 2,141,864

CONVERTIBLE RAILWAY VEHICLE

Charles Harwood, Jr., Rye, N. Y.

Application June 23, 1937, Serial No. 149,803

2 Claims. (Cl. 105—327)

This invention relates to improvements in railway vehicles and particularly to improvements in railway vehicles intended to serve a plurality of purposes, a particular object of the invention being so to modify the construction of an existing type of railway vehicle, such, for example, as a dining car, as to equip it for the showing of moving pictures.

Because of the competitive need for higher speeds in railway travel and of the limitation, particularly in the case of steam driven trains, in the weights that can be pulled at the higher speeds by locomotives of existing horse powers, it is important that the number of special purpose cars, particularly those that do not carry pay-loads, be reduced to the minimum. It is also important that special purpose cars have a sufficient earning capacity, if possible, at least to cover the cost of operation of these cars per se and also, if possible, to show a substantial profit.

The present invention aims not only to make possible an increase in the earning power of one of the existing types of special purpose cars, but also to make train travel more attractive by furnishing entertainment, thereby contributing to an increase in the earnings of cars used merely for passenger transportation. To this end the invention aims so to modify the construction of the ordinary dining car that, when not used for dining, it can readily be converted into a moving picture theatre properly equipped to show standard, current moving pictures efficiently.

An important feature of the invention is the utilization of a part of the equipment employed for dining to effect the conversion of the car into a theatre equipped for the exhibition of moving pictures.

Another important feature of the invention is the arrangement of the seating, the projection apparatus, the screen, etc., so that when the car is converted into a dining car it will differ little in arrangement and convenience from existing dining cars.

Other important features of the invention contributing to safety, comfort, etc., will be pointed out hereinafter or will appear from a study of the following description and claims when considered in connection with the accompanying drawings, in which Figure 1 is a horizontal section through a combination dining and cinema theatre car embodying the present invention, this view showing the arrangement of the tables and seats when the car is equipped for dining;

Figure 2 is a similar but partial section of the car showing the arrangement of the seats and tables when the car is equipped for the exhibition of moving pictures or for assembly purposes;

Figure 3 is a side elevation, partly in section, showing details of the floor and window arrangement;

Figure 4 is a plan view of part of the top of the car showing in dotted lines the arrangement of a ventilating or air-conditioning duct;

Figure 6 is a section on the line 6—6 of Figure 7;

Figure 7 is a longitudinal sectional detail illustrating the arrangement of the tables and seats on the side of the car having the single-seated tables, when the car has been converted into a moving picture theatre;

Figure 5:
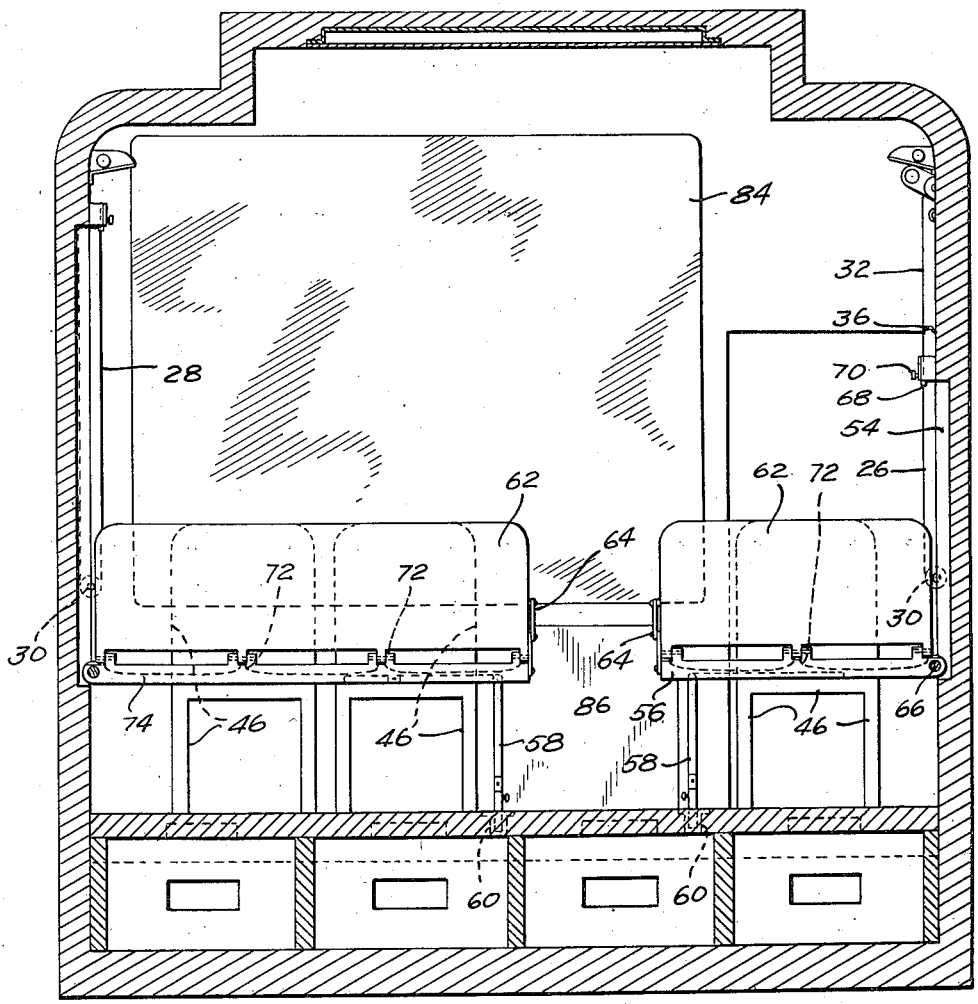
Figure 5 is a section on the line 5—5 of Figure 7.

As herein shown, that part of the car 2 which includes the arrangements for the storage, preservation, preparation and serving of food may be of usual construction, including the refrigerator 4, the food and service storage compartments 6, the sink 8, the range and steam table 10, the broiler 12, the locker 14, additional storage cabinets 16 for charcoal, sugar, coffee, etc. Also the service room 18, with the serving table 20 and its usual equipment, may be substantially as in present dining cars, although possibly slightly reduced in dimensions so as to provide a part of the space needed for the projection room 22. The remainder of the car, however, is modified, in accordance with the present invention, from the existing usual arrangements in order to provide for its ready conversion into a theatre. Instead of tables with seats upon opposite sides, with the usual window arrangement, it is preferable, as shown in Figure 1, to have narrower tables with seats on one side only and with the windows opposite the tables so that the tables may be utilized to effect the sealing of the windows when the car is to be converted into a theatre and that the window frames may provide table receiving recesses.

As shown in Fig. 1, the windows 24 on the two sides of the car are arranged respectively opposite the single tables 26 and the double tables 28. Both the tables 26 and the tables 28 are shown as hinged at 30 in the sides of the window casing so that they may be folded into the window casings out of the way while serving also to cover or partially to cover the windows to exclude the outside light when the car is to be converted into a theatre. As shown in Figure 7, the single tables are not long enough completely to cover the adjacent windows when folded up against the window casings and therefore other means are provided for completing the covering of the windows adjacent the single tables. Merely illustrative means for this purpose are short sections 32, hinged at 34 in the upper part of the window casing, which can be folded down to complete the covering of the window incompletely effected by the single tables. These short sections 32, as shown in Figure 6, can be folded up against the top of the car away from the windows 24 when the car is used for dining. As also shown in Figure 6, the abutting edges of the sections 32 and the short tables 26 may be rabbeted as shown at 36 to increase the light-excluding efficiency of the window covering when the parts are in the position shown in Figure 6.

Figures 8, 9:
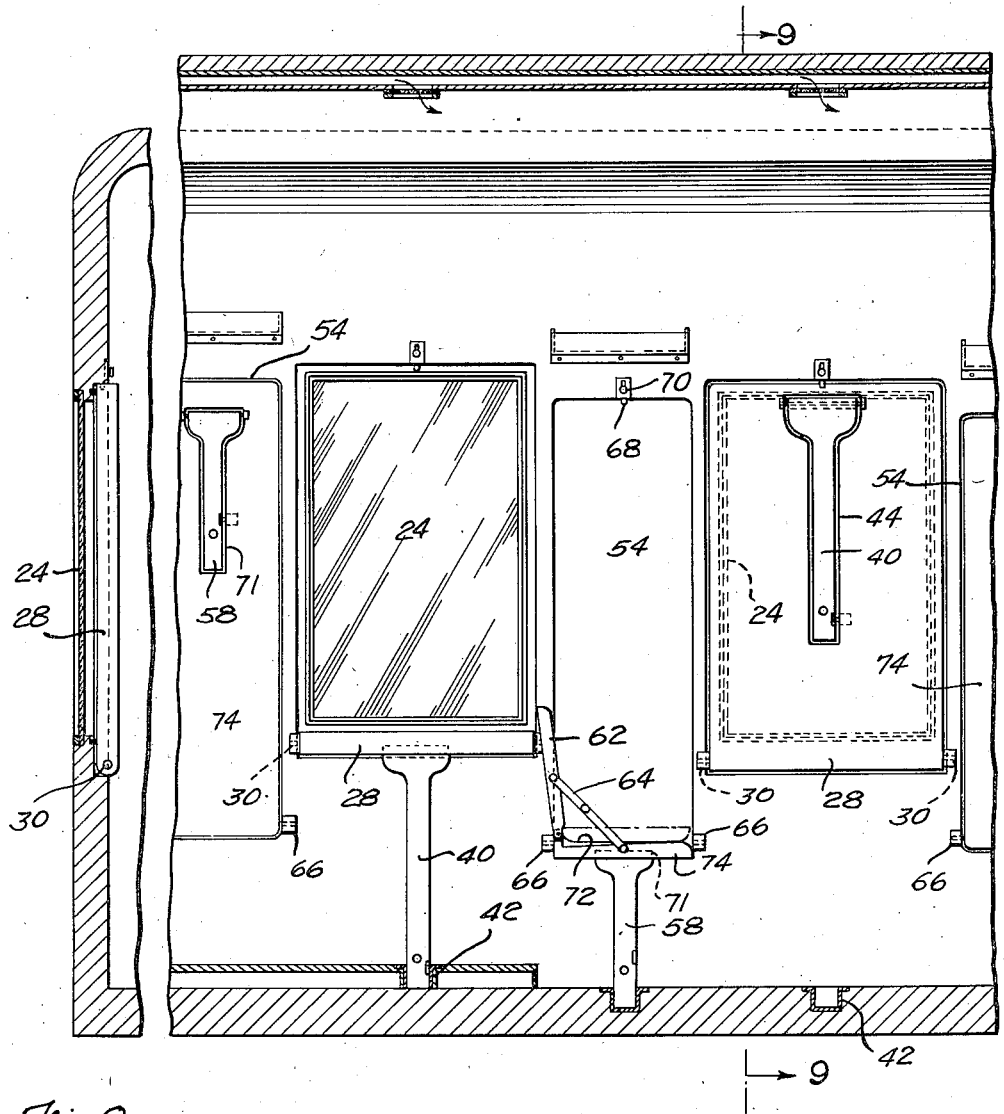
Figure 8 is a longitudinal sectional detail showing the side of the car having the double-seated tables, when the car has been converted into a moving picture theatre.
Figure 9 is a section on the line 9—9 of Figure 8.

As shown in Figure 8, the double tables are of such dimensions that they alone effect the complete covering of the windows 24 on their side of the car. Legs 38 and 40, hinged respectively to the under sides of the tables 26 and 28 at points remote from their hinged connections with the window casings are arranged to enter the sockets 42 in the floor when the tables are brought down into position for dining. Preferably the legs 38 and 40 are received into recesses 44 in the under sides of the tables so that no parts thereof project above the surfaces of the under sides of the tables when the tables are in window-sealing position. For dining purposes, the car is preferably equipped with the usual movable chairs 46.

When the car is to be converted into a theatre, the tables 26 and 28 are moved into their window-concealing and sealing positions as hereinabove described, the sections 32 being brought down into cooperative relation to the single tables 26, and the chairs 46 are then moved into the positions formerly occupied by the tables. If desired, the chairs 46 may be locked in these forward locations in any suitable manner as, for example, by a bayonet joint lock comprising a slidable rod 48 in the chair leg having a pin 50 slidable in the usual bayonet slot opening into the socket in the chair leg which receives the bolt 48, the bolt 48 being arranged to be turned by the knob 52 into locking position in the usual bayonet slot offset at the bottom of the socket for the bolt 48.

Additional seats or benches, staggered with respect to the chairs 46, can then be brought into position, such seats being here shown as folding seats foldable into recesses in the panels between the car windows. As shown in Figure 7, there is folded into a recess 54 in each panel between successive windows on the single table side of the car, when the car is used for dining, a folding seat or bench 56 of a length sufficient to seat two people, the seat or bench 56 having hinged thereto a leg 58 adapted to be received in a socket 60 in the car floor. The seat or bench 56 is also provided with a folding back 62 connected thereto by toggle links 64, the back being foldable down against the seat before the seat, hinged at 66 to the side of the car or rather in the sides of the recess 54, is folded up into the recess 54 and secured therein by the latch 68 provided with the operating knob 70. As in the case of the tables, the leg 58 is preferably receivable in a recess 71 in the bottom of the seat 56 so that when the seat is folded into the recess 54 the outer surface of the leg 58 will be flush with the bottom of the seat 56.

As shown in Figure 5, individual seat-defining ridges 72 may be provided to prevent the omnipresent "seat hog" from occupying more than one seat. The seats or benches 74, located between the windows adjacent to the 2-seated tables, are similar in their construction to the seats or benches 56, except that they are long enough to provide seating for three people. The legs 58, backs 62, seat-defining ridges 72 of the seats 74, etc. may be of the same construction and arrangement as the corresponding parts of the seats or benches 56. If it be desired to be sure that each of the spectators has an adequate view of the screen an inclined floor 76 may be provided which has its highest point at its end remote from the projection room. If this be done, then, as shown in Figure 3 of the drawings, a stepped arrangement of the windows 24 is necessarily desirable so that each of the tables will be at the proper height above its associated seating platform 78.

Figure 10:
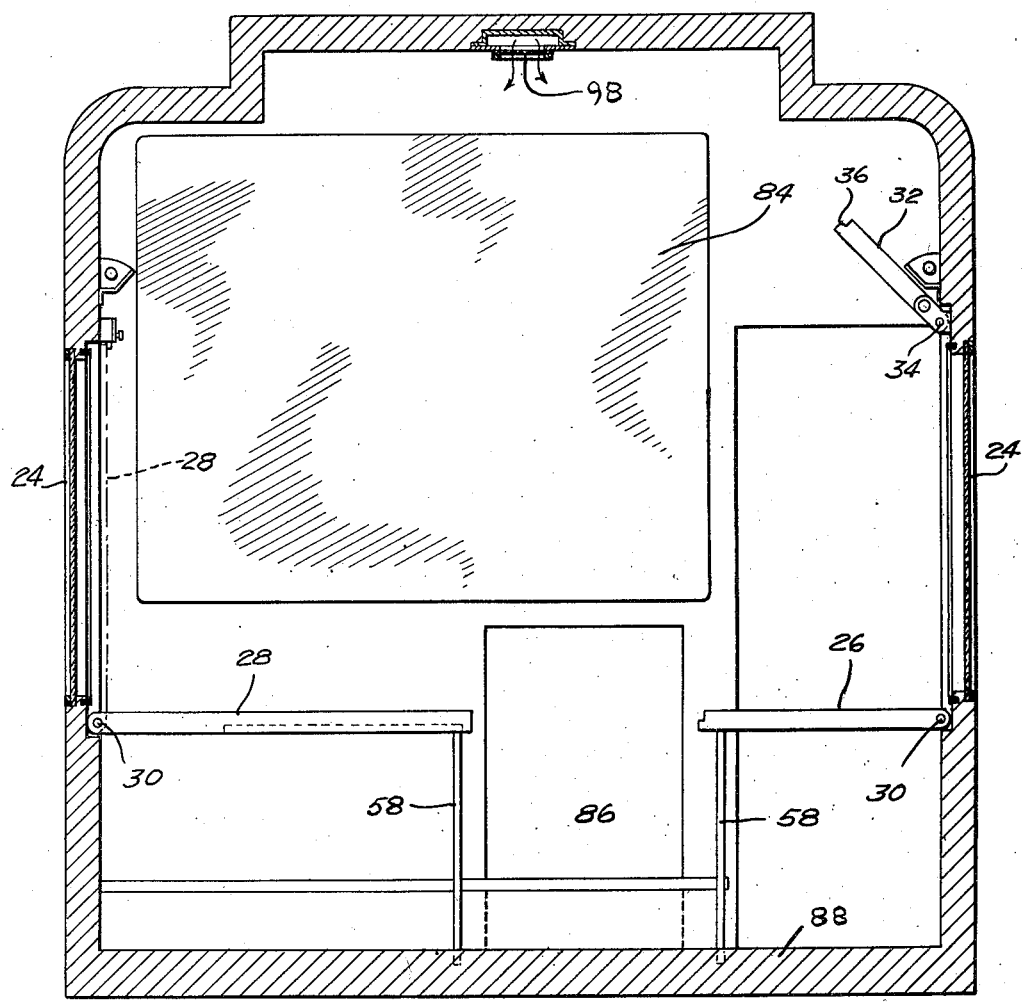
Figure 10 is a transverse section through the car, looking toward the projecting screen, showing the arrangement of the screen, the speaker's platform and the door for entrance into the projection room.

The projection apparatus 80 is located in the projection room 22 hereinabove referred to and to secure the desired magnification of the image has associated therewith a mirror or mirrors 82, the image being projected onto the rear of a translucent screen 84. Access to the projection room may be obtained through a door 86 located below the screen 84 as shown in Fig. 10.

It will be understood that the projection room will be of fireproof construction and provided with the usual safety attachments in the event that combustible film is to be used in the projection apparatus.

Although the projection room in the illustrative embodiment of the invention is shown as a separate compartment devoted solely to this purpose, it will be understood that its utility may not be so confined.

When, as shown in the illustrative embodiment of the invention, a series of seating platforms 78 is provided in stepped arrangement and the inclined aisle floor 76 associated therewith together provide space therebeneath between the platforms 78, the aisle floor 76 and the main floor 88 of the car, this space may be utilized to assist in the proper air conditioning of the auditorium.

As herein shown, air ducts 90 are provided in the cross supports 92 for the platform 78 and aisle floor 76 in order to provide for straight through circulation connected with any suitable air conditioning system, such as now employed in railway vehicles, and into the main conduit thus provided are intakes 94 beneath the front edges of the platforms 78. Fresh cooling air may be brought in from the air conditioning system through an overhead duct 96 having discharge openings 98 in the car ceiling.

What I claim as new is:

1. A combined railway diner and entertainment vehicle provided with dining tables and with movable chairs located upon one side only of the respective dining tables, successively stepped platforms each accommodating a table and its associated chair or chairs, correspondingly stepped windows arranged adjacent to the respective dining tables and providing recesses into which said tables may be folded, when not in use, for the purpose of excluding light, said car being also provided with recesses located between said windows and in line with the chairs on the respective platforms when used for dining, and benches foldable into said recesses, each of said benches being provided with one more seat than there are chairs for the associated table, thereby providing for an arrangement of the bench seats and chairs on each platform in a symmetrically staggered relation to each other when the table has been folded into its window recess, the chairs have been moved forward into the table position and the bench has been lowered into the former chair position.

2. A combined railway diner and entertainment vehicle provided with dining tables and with movable chairs located upon one side only of the respective dining tables, successively stepped platforms each accommodating a table and its associated chair or chairs, correspondingly stepped windows arranged adjacent to the respective dining tables and providing recesses into which said tables may be folded, when not in use, for the purpose of excluding light, said car being also provided with recesses located between said windows and in line with the chairs on the respective platforms when used for dining, benches foldable into said recesses, each of said benches being provided with one more seat than there are chairs for the associated table, thereby providing for an arrangement of the bench seats and chairs on each platform in a symmetrically staggered relation to each other when the table has been folded into its window recess, the chairs have been moved forward into the table position and the bench has been lowered into the former chair position, and means for locating and locking the chairs in predetermined relation to the seats of the benches when the chairs are moved into their aforementioned positions in front of the benches on the respective platforms.

CHARLES HARWOOD, Jr.